United States Patent [19]

Smith et al.

[11] Patent Number: 4,965,435
[45] Date of Patent: Oct. 23, 1990

[54] FORCED CONVECTION TUNNEL OVEN

[75] Inventors: Donald P. Smith, 4630 Woodfin Dr., Dallas, Tex. 75220; William W. Plumb, Dallas; Jarald E. High, Grand Prairie, both of Tex.

[73] Assignee: Donald P. Smith, Dallas, Tex.

[21] Appl. No.: 352,507

[22] Filed: May 16, 1989

Related U.S. Application Data

[63] Continuation-in-part of Ser. No. 54,748, May 27, 1987, Pat. No. 4,831,238, which is a continuation-in-part of Ser. No. 787,524, Oct. 15, 1985, Pat. No. 4,835,351.

[51] Int. Cl.$^5$ .............................................. F24H 3/04
[52] U.S. Cl. .................................. 219/388; 219/400; 126/21 A
[58] Field of Search ............. 219/388, 400; 126/21 A, 126/21 R; 34/191, 212, 216, 222, 229

[56] References Cited

U.S. PATENT DOCUMENTS

| | | | |
|---|---|---|---|
| 3,312,811 | 4/1967 | Shanklin | 219/400 |
| 4,462,383 | 7/1984 | Henke | 219/400 |
| 4,479,776 | 10/1984 | Smith | 219/400 |

*Primary Examiner*—Teresa J. Walberg
*Attorney, Agent, or Firm*—Crutsinger & Booth

[57] ABSTRACT

The tunnel oven generally includes a long cooking compartment through which a conveyor transports food products. The conveyor is spaced from a front wall of the cooking compartment to provide an air return route and to provide a walkway to facilitate cleaning and maintenance of the oven. A blower draws air from the cooking compartment and discharges air into an air distribution chamber formed in an upper portion of the cooking chamber and vertically spaced from the conveyor. A pair of plenums in the cabinet adjacent one edge of the conveyor deliver air from the distribution chamber to a plurality of air dispensing ducts communicating with the plenums on opposite sides of the conveyor for dispensing air onto opposite sides of the conveyor.

10 Claims, 8 Drawing Sheets

FORCED CONVECTION TUNNEL OVEN

CROSS REFERENCE TO RELATED APPLICATIONS

This application is a continuation-in-part of Application Ser. No. 07/054,748 filed May 27, 1987, now U.S. Pat. No. 4,831,238, issued May 16, 1989 entitled "HIGH VOLUME FORCED CONVECTION TUNNEL OVEN" which was a continuation-in-part of Application Ser. No. 06/787,524 filed Oct. 15, 1985 now U.S. Pat. No. 4,835,351, issued May 30, 1989 entitled "OVEN HUMIDITY RESERVOIR".

FIELD OF INVENTION

The invention relates to a method and apparatus for transferring heat to or from food products adapted for commercial baking and food processing applications.

BACKGROUND OF INVENTION

Impingement cooking ovens of the type disclosed in U.S. Pat. No. 3,884,213 direct jets of temperature controlled gaseous fluids to impinge against irregular shaped food products to subject discrete areas of the surface of the food product to a very high heat transfer rate. The product moves such that areas subjected to the high heat transfer rate move over the surface of the product to obtain desired overall surface effects such as crisping, browning, searing or freezing.

Impingement ovens for foodservice applications enjoy commercial success because the time to cook food products, such as pizza, has been greatly reduced. Ovens used in commercial food processing and bakery applications require that large quantities of food be cooked while minimizing downtime for cleaning, maintenance and repair.

U.S. Pat. Nos. 4,154,861, 4,479,776 and 4,492,839 disclose a variety of fan, plenum and air dispensing devices to precisely control heat transfer to upper and lower surfaces of food products. The food products have been carried on a conveyor through tunnel ovens having air dispensing devices above and below the conveyor for top and bottom heat transfer to the food product.

U.S. Pat. No. 4,474,498 discloses a generally vertically disposed plenum extending along the back wall of an oven compartment, the compartment being divided into a plurality of horizontally spaced chambers and having conveyors moving there-through, one above the other such that a food product is moved through the heating compartment for controlling transfer of heat to the product.

U.S. Pat. No. 4,523,391 disclosed a plenum having a plurality of inwardly inclined front wall panels adapted to direct the flow of air through an elongated plenum outlet port to air dispensing ducts positioned above and below a conveyor. Return ducts and the plenum were formed in a side of the housing adjacent one side of the conveyor permitting the flow of air generally transversely of the conveyor to return to the suction side of the fan.

The apparatus disclosed in the aforementioned patents generally incorporated a blower mounted either above or below a conveyor such that air impinging against the surface of the food product on the opposite side of the conveyor from the blower circulated partially through the conveyor and between air dispensing fingers to return to the intake side of the blower. However, when high air flows are applied to products carried on a solid conveying band, the recirculating air must pass beside the conveyor to return to the intake of the fan.

The air flow rate through ovens of the type hereinbefore described and disclosed in the patents cited above was somewhat limited since air must circulate through the compartment without interfering with air streams which impinge against and transfer heat to the surface of the food product carried by the conveyor. Ovens used for commercial bakery and food processing applications are often equipped with conveyor belts from 8 to 12 feet wide for carrying food products through the oven. Solid impervious conveyor belts and belts constructed of mesh material when completed covered by pans greatly obstruct circulation of air.

The conveyors are generally a flexible band supported by spaced parallel rollers extending across the width of the conveyor. The intense heat in the oven and operating conditions to which conveyor rollers are subjected has heretofore presented maintenance problems. If bearings for supporting the conveyor are mounted outside of the cooking compartment seals are required around shafts projecting through the wall of the chamber. The extension of roller mounting shafts through the wall of the chamber results in heat loss, requires longer support shafts than would be required if bearings were mounted inside the chamber and often interferes with insulating chamber walls. Bearings mounted outside of the chamber often require a secondary oven covering.

If bearings are mounted inside of the cooking compartment, access doors are formed in at least one wall of the cooking compartment to provide access to the interior of the compartment. Multiple access doors are necessary for lubricating, cleaning and replacing bearings supporting the rollers when the support shafts do not extend through oven walls. The doors are expensive, generally used infrequently in bakeries, and are sources of heat loss and mechanical problems.

In ovens used for baking bread, rolls, cookies and other bakery products, vacuum cleaning devices have been employed for removing residue of dough products from the interior of the oven. Further, the access doors were necessary for lubricating, cleaning and replacing bearings supporting the rollers.

SUMMARY OF INVENTION

Two embodiments of a forced convection tunnel oven are disclosed which incorporate a blower for delivering air through a distribution chamber to a bifurcated plenum for delivering air to spaced ducts having gates mounted therein adjacent each of the dispensing ducts for controlling the volume of air delivered into each air dispensing duct. Thus, the rate at which heat is transferred to a food product by air delivered through each duct is controllable and the flow of air through the various ducts is independently adjustable relative to the flow of air through each of the other ducts.

The blower unit is preferably positioned either above or below the conveyor to minimize the floor space occupied by the cooking apparatus. Air from the conveyor is delivered through a plenum extending generally vertically through the cooking compartment and delivering air to air dispensing ducts above and below the conveyor, gates being provided for adjusting air flow to each dispensing duct.

Sufficient space is provided in the housing between the wall of the housing and the conveyor to permit rapid return of air dispensed onto the surface of the food product on the opposite side of the conveyor from the intake of the blower along a path extending generally vertically through the housing.

The tunnel oven generally comprises a plurality of spaced cooking compartments through which a conveyor transports food products. An air distribution chamber is formed in each cooking chamber and is vertically spaced from the conveyor. A blower draws air from the cooking compartment and discharges air into the air distribution chamber in a plane generally parallel to the plane of the conveyor. A pair of plenums in the cabinet adjacent one edge of the conveyor deliver air from the distribution chamber to a plurality of air dispensing ducts on opposite sides of the conveyor for dispensing air onto opposite sides of the conveyor. An air flow control gate is mounted to adjust air flow from the distribution chamber into the plenums to control the proportion of air flow directed to each plenum. The conveyor is spaced from walls of the cooking compartment a distance sufficient to permit passage of air adjacent the edge of the conveyor enroute to the blower without interfering with flow of air from the air dispensing ducts toward the conveyor.

The plenums are formed by spaced walls extending longitudinally of the cabinet adjacent one edge of the conveyor. Air flow sensors in each of the plenums provide indicia indicative of air flow through each plenum.

Hangers are provided in each cooking compartment to adjust the position of the dispensing ducts relative to the conveyor.

The second disclosed embodiment of the tunnel oven is provided with sufficient space between an edge of the conveyor and a wall of the cooking chamber to permit substantially unobstructed flow of air adjacent an edge of the conveyor while providing a walkway which facilitates maintenance and cleaning of the tunnel oven.

DESCRIPTION OF DRAWING

Drawings of two preferred embodiments of the invention are annexed hereto so that the invention may be better and more fully understood, in which.

Numeral references are employed to designate like parts throughout the various figures of the drawing.

DESCRIPTION OF PREFERRED EMBODIMENTS

Figure 1:
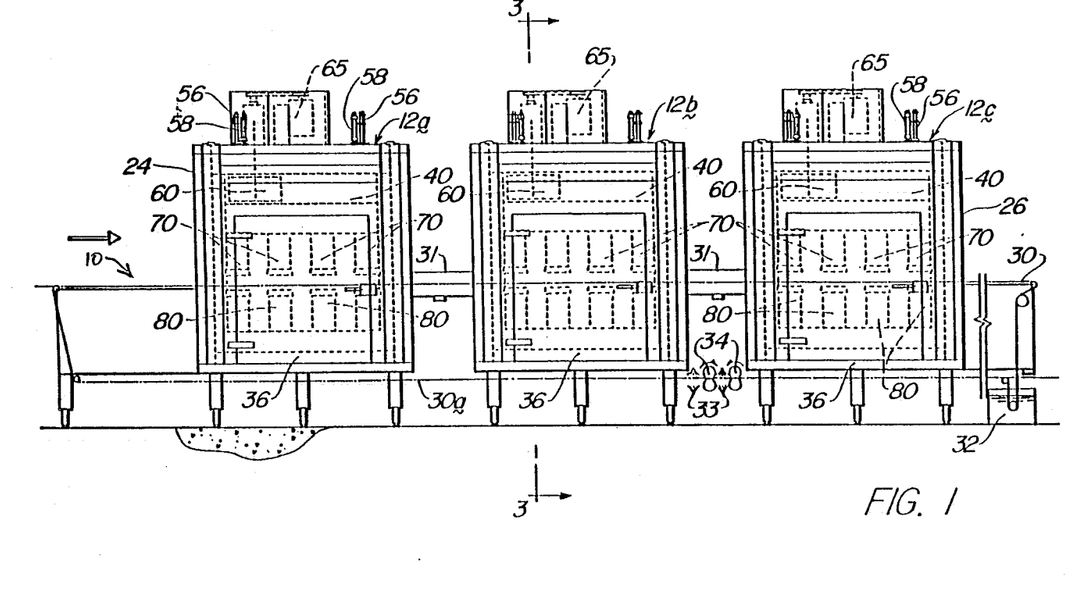
FIG. 1 is a front elevational view of a first embodiment of the forced convection tunnel oven.
Figure 2:
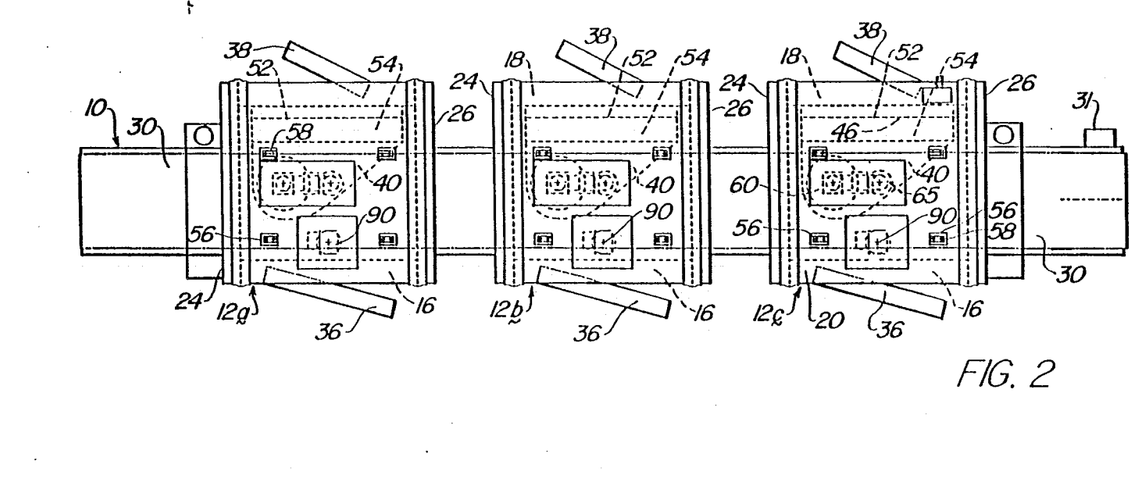
FIG. 2 is a top plan view thereof.
Figure 3:
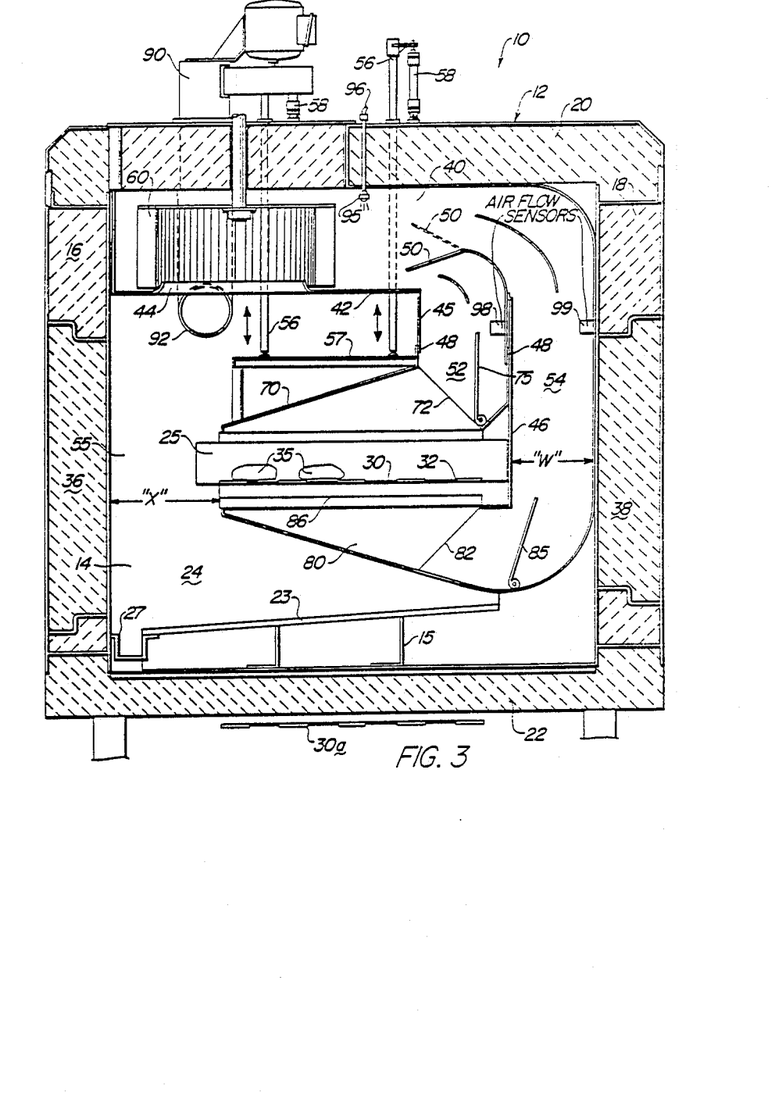
FIG. 3 is a cross-sectional view taken along line 3—3 of FIG. 1.
Figures 4, 5:
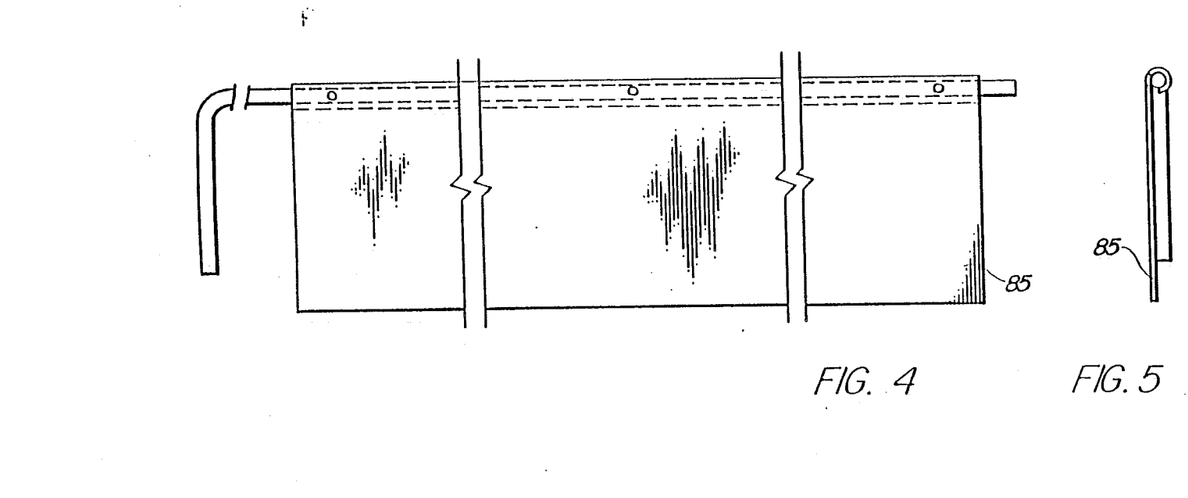
FIG. 4 is a front elevational view of a gate to be mounted in the plenum for controlling air flow to an individual air dispensing duct.
FIG. 5 is side elevational view of the gate illustrated in FIG. 4.

A first preferred embodiment of the high volume force convection tunnel oven is generally designated by the numeral 10 in FIGS. 1 and 2 of the drawing. Cooking apparatus 10 generally comprises a plurality of spaced cabinets 12a, 12b, and 12c. As illustrated in FIGS. 2 and 3, each cabinet 12 has a cooking chamber 14 therein defined between front wall 16, back wall 18, top 20, bottom 22 and spaced end walls 24 and 26. A conveyor 30 transports food products 35 through an inlet opening 25 and an exit opening 27 in each cabinet 12. Conveyor 30 preferably comprises a wire mesh conveyor belt which is routed as illustrated in FIGS. 1 and 3 of the drawing to form an upper flight extending through the cabinet and a lower flight 30a which extends below the floor or bottom wall 22 of each cabinet 12. As illustrated in FIG. 2, a variable speed drive motor 31 positioned adjacent the discharge end of the conveyor rotates conveyor 30 at a controlled speed. Conveyor 30 is routed around suitable idler drums and preferably moves through a cleaning drum 32, adjacent belt cleaning spray nozzles 33 and cleaning brushes 34 for maintaining conveyor 30 in a clean sanitary condition.

A false bottom 23 is supported by legs 25 in an inclined position, as illustrated in FIG. 3, above bottom wall 22 of the cabinet such that any drippings or liquid used for cleaning the compartment will be directed into a gutter 27 which is connected to a suitable drain for disposal of drippings and cleaning solutions.

Front wall 16 is provided with a door 36 while back wall 18 is provided with a door 38.

A generally horizontally disposed distribution chamber 40 is formed adjacent top 20 of the cabinet 12. Chamber 40 is formed between a generally horizontally disposed wall 42 having an air intake opening 44 formed therein and top wall 20 of the cabinet.

Two generally vertically disposed plenums 52 and 54 are formed adjacent back wall 18 of the cabinet, a first plenum 52 being formed between vertical walls 45 and 46 and a second plenum 54 being formed between vertical wall 46 and the back wall 18 of the cabinet. A gate 50 is pivotally secured adjacent the upper end of the central vertical wall 46 between the first plenum 52 and the second plenum 54 and is movable from the position illustrated in full outline in FIG. 3 to the position illustrated in dashed outline for adjusting air flow from distribution chamber 40 through the vertically disposed plenums 52 and 54.

As best illustrated in FIGS. 2 and 3 of the drawing, upper fingers 70 are suspended from vertically movable hanger members.

Figure 8:
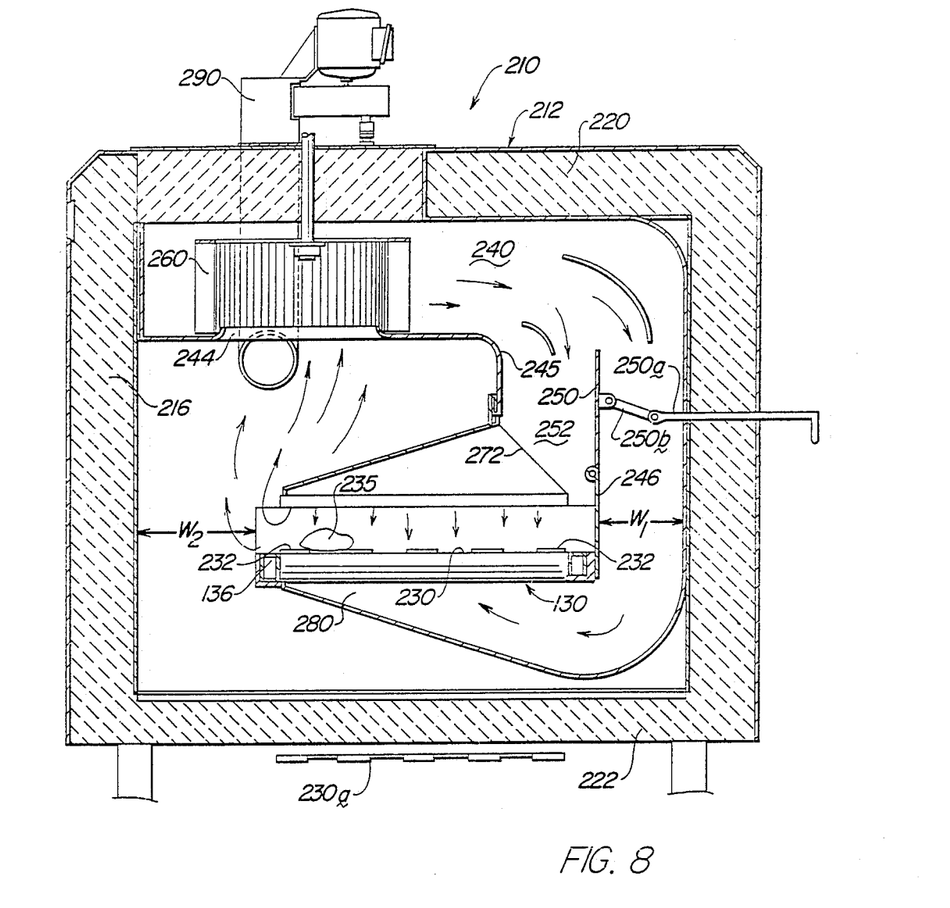
FIG. 8 is a cross-sectional view taken along line 8—8 of FIG. 6.

As best illustrated in FIG. 8 of the drawing, upper fingers 270 are suspended from hanger members 256 to permit removal of the upper fingers 270 for cleaning. Passages in the upper air dispensing duct 270 are formed to project a stream of air toward the upper surface of conveyor 230. Since the height or thickness of food products carried by conveyor 230 may vary, it is important that air dispensing passages in the upper duct 270 be formed to project streams of air a sufficient distance to impinge against the surface of the conveyor if products carried by the conveyor are very thin. However, it is important that the passages be formed to form streams which are capable of impinging against the surface of relatively thick products, such as loaves of bread while permitting spent air which has impinged against the surface of the food product to return toward the intake of blower 260 without interfering with adjacent projected streams directed toward the surface of the conveyor.

It has been found that the lower surface of upper jet finger 70 should be spaced from the upper surface of conveyor 30 a distance which is in a range between four and six times the least dimension of air dispensing passages or orifices. Thus, if the upper air dispensing duct 70 is spaced five inches above the upper surface of the conveyor 30, the air dispensing passages in the lower surface of dispensing duct 70 would preferably be circular passages approximately one inch in diameter or elongated slots having a width of approximately one inch.

The air directing openings in air dispensing duct 70 are selected for delivering an appropriate amount of air. The amount of air delivered in each successive zone in modules 12a, 12b and 12c of the tunnel oven 10 varies from zone to zone depending upon the heating requirements of the food product moving through the tunnel oven. Careful adjustment of the area of air delivery openings, velocity of air moving through the openings, temperature of the air and the speed of the conveyor 30 permit precise control of the cooking process.

For example, in baking ovens, the temperature in the first baking zone 12a is lower than in subsequent zones and the air volume and the velocity of the air are moderate. In the middle zone 12b of the tunnel oven, temperatures and air volumes are increased. In the final zone 13c, higher temperature and higher air velocities are employed to brown the crust on the bakery product.

For baking bread, high air velocity at moderate temperature early in the baking cycle in module 12a provides heat at low temperature so that the bread expands well without forming a strong crust. In the center of the baking cycle in module 12b, low air volume at similar temperature does not overbake the outside of the loaves until the centers of the loaves are heated. A final higher air volume with higher temperature is adjusted to give the special type of crust desired.

The openings in the air ducts to provide a high volume of air, for example, 4% of the effected area of the product in the area under the air duct and the dead space between adjacent ducts 70. Moderate air volume is applied by employing fewer openings in each air dispensing duct 70 or by spacing the air dispensing ducts 70 further apart thus increasing the dead space between adjacent duct 70.

A fan or blower 60 is rotatably disposed in chamber 30 and is driven by a variable speed blower motor 65 mounted on top wall 20.

A plurality of horizontally spaced upper air dispensing ducts 70 are secured to spaced openings 72 which communicate with the interior of plenum 52 for dispensing air delivered through plenum 52 onto the upper surface of food products 35 carried by conveyor 40. A plurality of lower plenums 80 are spaced longitudinally of cooking compartment 14 and communicate with openings 82 in wall 46 of plenum 54 such that air flowing through plenum 54 enters lower dispensing ducts 80 and is dispensed onto the lower surface of food products 35 carried on conveyor 30.

Dampers 75 and 85 are preferably adjustably positioned adjacent openings 72 and 82 communicating with plenums 52 and 54 to provide independent adjustment of air flow through each of the spaced upper dispensing ducts 70 relative to each of the other upper dispensing ducts and to provide adjustment of flow from each of the lower dispensing ducts relative to each of the other lower dispensing ducts. Gate 50 and dampers 75 and 85 are of substantially identical construction, except that dampers 75 and 85 are shorter. For example, if the spacing between interior end walls 24 and 26 is six feet, gate 50 is approximately six feet long, while dampers 75 and 85 may be only six inches long. It should be readily apparent that gate 50 can be manipulated for adjusting flow of air from chamber 40 to plenums 52 and 54 while dampers 75 and 85 can be manipulated for adjusting flow through individual ducts 70 and 80 for precisely adjusting the sequence and intensity of heat transfer to upper and lower surfaces of food product 35. A conventional air heating element such as gas fired heated 90 delivers heated air through supply duct 90 into cooking compartment 14 in each cabinet 12. The heated air is preferably dispensed adjacent the intake opening of blower 60.

For control of the humidity of recirculated air, a humidifier is provided. In the disclosed embodiment a steam spray nozzle 95 is connected through a steam line 96 to a suitable source of steam (not illustrated). The dispensing of steam through nozzle 95 into air distribution chamber 40 may be controlled manually or by a humidistat for automatic control of the relative humidity of air circulating through the system.

A pair of air flow sensors 98 and 99 are mounted in plenums 52 and 54, respectively to indicate the pressure or flow rate of air through ducts 52 and 54 to provide a visual indication of the relative flow rates of air through plenums 52 and 54. The flow rate through the plenums can be adjusted by manipulating gate 50 as hereinbefore explained.

As best illustrated in FIG. 3 of the drawing, the edge 32 of conveyor 30 is spaced a distance "X" from front wall 16 of cabinet 12. If the sum of the areas of openings 86 in lower dispensing duct 80 through which air is supplied to the bottom surface of food product 35 is more than 6% of the effective area of the product or conveyor 30 being heated, the dimension designated "X" should be sufficient to permit the escape of spent air and should be larger than the area of openings 86. Fingers 70 and 80 are preferably relatively narrow ducts extending across the width of conveyor 30 and deliver a volume of air such that the total volume of air in cooking compartment 14 is recirculated at least once every two seconds or less.

In the embodiment of the invention illustrated in FIG. 3 of the drawing, plenum 54 delivering air through lower dispensing ducts 80 to the lower surface of conveyor 30 is more than 10% of the width of conveyor 30 so that air can be supplied through openings 86 which are more than 6% of the effective area of conveyor 30 or product 35 swept by the air. The width "W" of plenum 54 through which air is delivered to lower dispensing ducts 80 is preferably at least three times the effective area of openings 86 in duct 80.

The return space 55 having a width "X" for spent air on the side of conveyor 30 away from plenums 52 and 54 must be more than 10% of the width of conveyor 30. The return space 55 is preferably 20% or more of the conveyor width in order to give maximum air flow from air supply openings 86 in lower ducts 80. Thirty percent or more is preferable. Thus, for a four foot wide conveyor 30, with air supply openings 86 in lower ducts 80 equalling 10% of the area of conveyor 30, the return space 55 preferably has a width "X" of at least 14 inches.

It should be readily apparent that the cabinet illustrated in FIG. 3 of the drawing may be inverted if it is deemed expedient to position blower 60 at the bottom of the compartment.

In the embodiment illustrated in FIG. 3 of the drawing wherein blower 60 is located in the upper portion of cabinet 12, air is delivered through chamber 40 in a plane generally parallel to the surface of conveyor 30. When this air is turned 90? at gate 50 into plenums 52 and 54, the air is advantageously spread through the length of each plenum in a direction generally longitudinally of back wall 18. Thus, air pressure adjacent dampers 75 and 85 is fairly uniform. Flow into each dispensing duct 70 and 80 is precisely controllable by dampers 75 and 85.

The spaced cabinets 12a, 12b and 12c are joined by generally rectangular shaped hollow tubular bridge sections 31, as illustrated in FIG. 1 of the drawing. As hereinbefore described, conveyor 30 extends through openings in end walls 24 and 26 of each compartment and through tubular bridge members 31. The air distribution chamber 40 is spaced vertically from conveyor 30. Each blower 60 in the individual cabinets draws air from the cooking compartment in the respective cabinet and discharges the air into the distribution chamber in a plane generally parallel to the plane of conveyor 30.

It should be readily apparent that plenums 52 and 54 are adjacent the rear edge of conveyor 30 in the illustrated embodiment and that upper air ducts 70 and lower air ducts 80 communicate with the respective plenums and dispense air onto opposite sides of conveyor 30. The edge of conveyor 30 adjacent front wall 16 of the cabinet is spaced a distance indicated by "X" from front wall 16 to permit passage of air adjacent the front edge of the conveyor enroute to the blower 60 without interfering with flow of air from air dispensing ducts 70 and 80 toward the conveyor 30.

Air flow sensors 98 and 99 indicate the volume of air flowing through plenums 52 and 54. Gate 50 can be adjusted to adjust the air flow through the respective plenums while dampers 75 and 85 are adjustable for adjusting the air flow to individual distribution ducts 70 and 80.

It should be appreciated that other and further embodiments of the invention may be devised without departing from the basic concept thereof.

DESCRIPTION OF A SECOND EMBODIMENT

A second embodiment of the forced convection tunnel oven, generally designated by the numeral 200, is illustrated in FIGS. 6-10 of the drawing. Tunnel oven 200 is similar to the first embodiment generally designated by the numeral 10 in FIGS. 1-5 of the drawing. However, it will be noted that modules 212a, 212b and 212c are joined to form a single long continuous cooking chamber 214 extending through modules 212a, 212b, and 212c.

Figure 6:
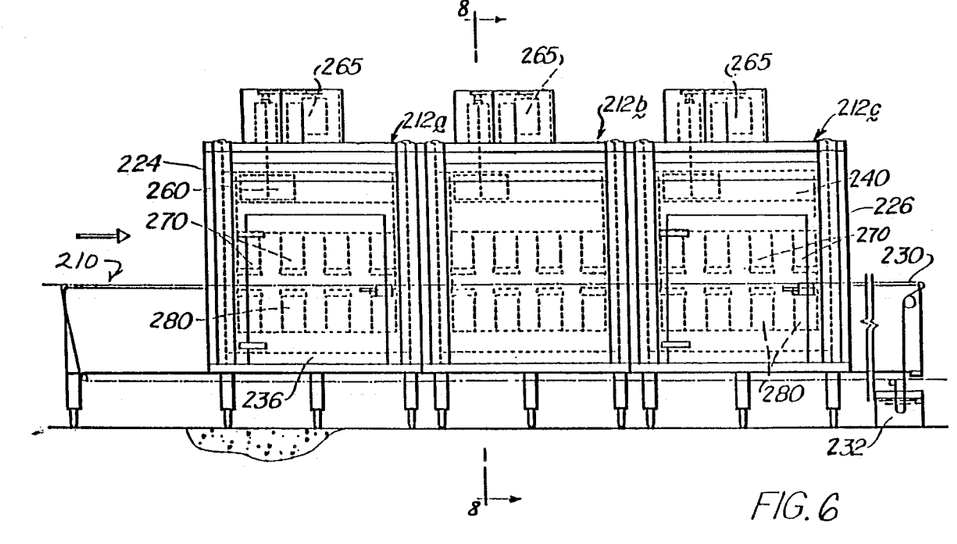
FIG. 6 is a front elevational view of a second embodiment of the forced convection tunnel oven.

A conveyor 213 extends through cooking chamber 214 between a front wall 216 and a back wall 218.

Figure 7:
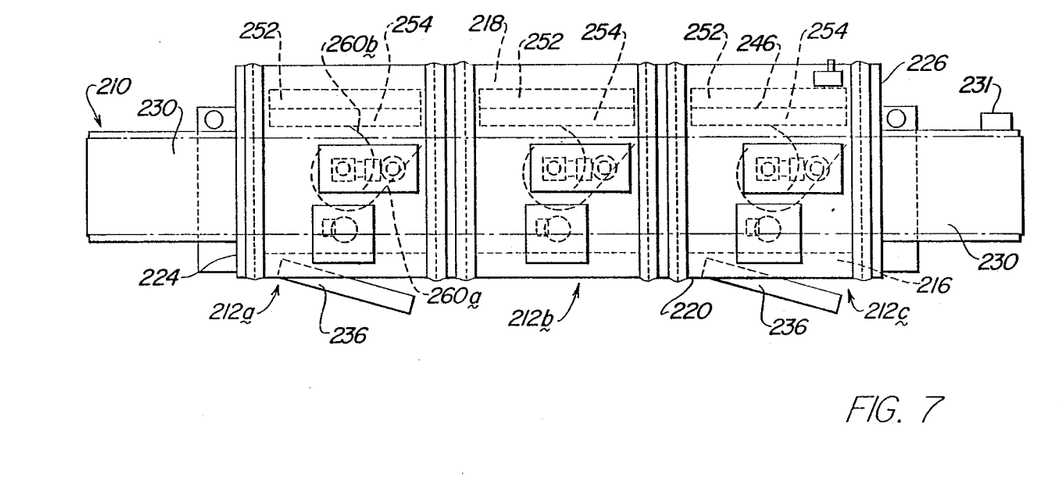
FIG. 7 is a top plan view of the second embodiment of the tunnel oven.

Referring to FIGS. 6 and 7 of the drawing, it will be noted that modules 212a, 212b, and 212c are connected. As best illustrated in FIG. 7 of the drawing, one or more of the modules 212a and 212c is provided with an access door 236 while some of the other modules 212b are not provided with access doors. Heretofore, it has been necessary to provide access doors almost continuously along the length of conveyors to permit access to the inside of the oven for cleaning and maintenance.

As illustrated in FIG. 7 of the drawing, blower 260 is positioned approximately in the center of module 212a intermediate opposite ends thereof and is provided with two bolutes 260a and 260b, inner ends of which are substantially diametrically opposed across blower 260. This construction permits air delivered by blower 260 to be distributed more uniformly through the chamber. It has been observed that positioning blower 260 as illustrated in FIG. 7 of the drawing as compared to the position illustrated in FIG. 2 of the drawing results in less air being drawn into the tunnel oven through the entrance 24 and less heated air being discharged through the exit opening 26 from module 213c.

As best illustrated in FIG. 8 of the drawing, a gate 250 is pivotally secured to the upper edge of vertical partition wall 246 and is actuated by a push rod 250a, which extends through an opening in the rear wall 218. Push rod 250a is hingedly connected to a link 250b which is pivotally secured to gate 250. It should be readily apparent that longitudinal movement of push rod 250a rotates gate 250 for dividing and distributing the flow of air from air dispensing chamber 40 into plenums 252 and 254. Adjustment of gate 250 permits adjustment of the volume of air delivered through upper dispensing duct 270 relative to that delivered through the lower dispensing duct 280.

Referring to FIG. 8 of the drawing, it will be noted that the distance W2 between the front wall 216 and the edge 232 of the conveyor is sufficiently wide to provide a walk way extending longitudinally through cooking chamber 214 providing access to upper and lower air dispensing ducts 270 and 280 and to the conveyor 230 for cleaning and maintenance. The walk way W, having a width W2, forms an air return route for air delivered downwardly through plenum 254 and directed upwardly through openings in the lower air dispensing duct 280 toward the lower surface of conveyor 230 or pans of food products carried thereon. The plenum 254 has a width W1, as illustrated in FIG. 8. The width W2 between the edge of conveyor 230 and the front wall 216 is preferably equal to or greater than the width W1 of plenum 254 to assure that air delivered from the lower air dispensing duct 280 is provided with a route for returning to the intake 244 of blower 260 without interfering with flow of air from the air dispensing ducts 280 toward the lower surface of conveyor 230.

Figure 9:
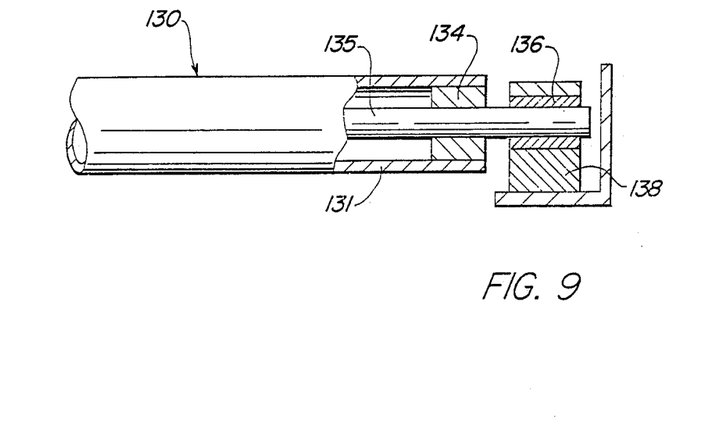
FIG. 9 is a partially sectionalized view of a first form of a conveyor roller mounting.
Figure 10:
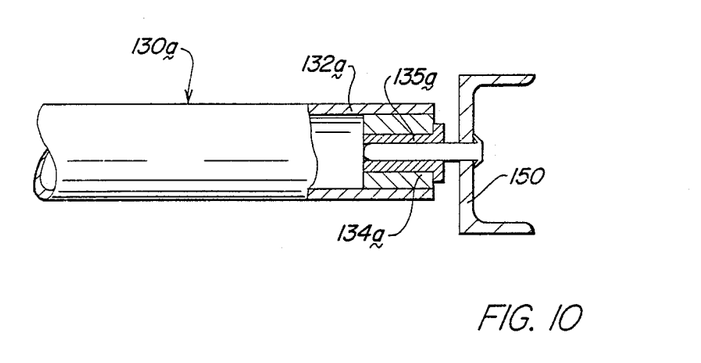
FIG. 10 is a partially sectionalized view of a second form of a roller bearing mounting.

As illustrated in FIGS. 8, 9 and 10 of the drawing, conveyor belt 230 is supported by rollers 130 rotatably supported in mountings 140 mounted on a track 150.

The roller generally designated by the numeral 130 in FIG. 9 of the drawing comprises a hollow tubular sleeve 131 having ends closed by cylindrical plugs 134 having apertures formed therein through which a shaft 135 extends. The end of shaft 135 extends through a bearing sleeve 136 supported in a bearing block 138.

The bearing sleeve 136 is preferably formed of carbon, polyimide compound or other material capable of withstanding relatively high temperatures, for example, 400° F. Some ball and roller bearings have been designed to operate at high temperatures. However, the bearings require maintenance for cleaning, lubrication and removal of worn parts.

The provision of a walk way having width W2 provides access to one end of the rollers. The split bearing blocks can be opened allowing replacement of sleeve, roller, ball or other bearings. The bearings attached to or included in the opposite end of the rollers can be serviced from the walkway by removing and replacing the roller from one end.

A second form of roller, generally designated by the numeral 130a, is illustrated in FIG. 10 of the drawing. This roller comprises a hollow elongated sleeve 132a having a bearing cap 134a closing the end thereof. The bearing cap has a central aperture for receiving bearing sleeve 135a which is supported on a pin 138 welded or otherwise secured to a rail 150 extending longitudinally of the cooking chamber 214.

From the foregoing it should be readily apparent that the space W2 between the edge of conveyor 230 and the front wall 216 is proportional to the width of the conveyor 230. The area of the air return path, assuming that conveyor 230 is impervious or substantially all of its area is covered by baking pans, is substantially equal to the width W2 of walkway W times the length of the cooking chamber 214. The area of the return path is preferably equal to two to five times the sum of the areas of dispensing openings through which air is dispensed from dispensing ducts 280. A representative wide oven may have 4% orifice area compared to the area of the product upon which air is dispensed through dispensing duct 280 plus the space between the finger and an adjacent finger 280. For example, in a twelve foot wide oven with 4% times 4 times equals a minimum 23 inch wide air return space W2 between the conveyor and front wall 216.

Many bakery ovens presently in use are cleaned with long vacuum tools. Some ovens are provided with very inconvenient entrance ways through a small port requiring that service personnel crawl under the conveyor for cleaning and maintenance. The walkway hereinbefore described provides much more convenient access for cleaning and maintaining the oven.

The invention having been described, what is claimed is:

1. A tunnel oven comprising: a cooking compartment; a front wall and a rear wall on said cooking compartment; a conveyor having edges and upper and lower surfaces, said upper surface lying in a plane in said cooking compartment, said conveyor being adapted to transport food through said compartment between said front wall and said rear wall; an air distribution chamber spaced from said conveyor; air circulating means having an intake to draw air from said cooking compartment and adapted to discharge air into said air distribution chamber; a plenum in said cooking compartment between said rear wall and one edge of said conveyor; air dispensing means having air dispensing openings communicating with said plenum for dispensing air toward one of said conveyor surfaces, said conveyor being spaced from said front wall of said cooking compartment a distance sufficient to permit passage of substantially all of the air delivered through said plenum between a first edge of said conveyor and the rear wall through space between the other edge of said conveyor and the front wall enroute to the intake of said air circulating means.

2. A tunnel oven according to claim 1, said conveyor being supported by spaced rollers; bearing means inside said cooking compartment rotatably supporting said rollers, said space between said front wall and an edge of the conveyor being sufficient to provide a walkway to facilitate replacement of said bearing means.

3. A tunnel oven according to claim 2, said bearing means comprising: a split bearing block; and a graphite sleeve.

4. A tunnel oven according to claim 2, wherein said first and second plenums are formed by spaced walls extending longitudinally of said cabinet adjacent one edge of said conveyor.

5. A tunnel oven according to claim 1, said air circulating means comprising: a blower having an intake opening communicating with a central portion of said cooking compartment; and a pair of air directing bolutes, said bolutes having inner ends positioned adjacent the outer periphery of said blower, said inner ends being substantially diametrically opposed relative to said blower.

6. A tunnel oven according to claim 1, with the addition of a second plenum in said cooking compartment, said first and second plenums being separated by air flow control means adapted to adjust the proportion of the volume of air delivered by said air circulating means into said first and second plenums; second air dispensing means having air dispensing openings communicating with said second plenum for dispensing air toward a second of said conveyor surfaces.

7. A tunnel oven according to claim 1, with the addition of: means to control humidity of air in said cooking compartment.

8. A tunnel oven according to claim 1, with the addition of: a plurality of cooking compartments; means routing said conveyor sequentially through each of said cooking compartments.

9. A tunnel oven according to claim 1 in which the space "X" between the edge of the conveyor and the side wall of the oven is at least 12% of the width of the conveyor and the total area of said air dispensing openings in the air dispensing ducts is more than 6% of the conveyor area.

10. A tunnel oven comprising: a cooking compartment; means to control temperature of air in said compartment; side walls on said cooking compartment; a conveyor having edges and upper and lower surfaces, said upper surface lying in a plane in said cooking compartment, said conveyor being adapted to transport food through said compartment; an air distribution chamber spaced from said conveyor; blower means adapted to draw air from said cooking compartment and to discharge air into said air distribution chamber in a plane generally parallel to the plane of said conveyor; first and second plenums in said cooking compartment adjacent one edge of said conveyor; a gate adapted to divide air flow from said air distribution chamber into said first and second plenums; a plurality of air dispensing ducts having air dispensing openings communicating with said plenums on opposite sides of said conveyor for dispensing air toward said upper and lower surfaces of said conveyor, said conveyor being spaced from walls of said cooking compartment a distance sufficient to form a walkway extending longitudinally of the cooking compartment and to permit passage of air adjacent an edge of the conveyor enroute to said blower without interfering with flow of air from said air dispensing ducts toward said conveyor.

* * * * *